Oct. 3, 1972   R. J. BROCK ET AL   3,695,985
HIGH BULK LAMINATES
Filed July 29, 1970   5 Sheets-Sheet 4

INVENTORS.
ROBERT J. BROCK
GORDON D. THOMAS
BY
Wolfe, Hubbard, Lydig, Voit & Osann
ATTORNEYS.

INVENTORS:
ROBERT J. BROCK
GORDON O. THOMAS

BY
Wolff, Hubbard, Leydig, Voit & Osann
ATTORNEYS.

United States Patent Office 3,695,985
Patented Oct. 3, 1972

3,695,985
HIGH BULK LAMINATES
Robert J. Brock, Appleton, and Gordon D. Thomas, Neenah, Wis., assignors to Kimberly-Clark Corporation, Neenah, Wis.
Filed July 29, 1970, Ser. No. 59,147
Int. Cl. B32b 3/28
U.S. Cl. 161—129    9 Claims

ABSTRACT OF THE DISCLOSURE

A high bulk, high strength, resilient nonwoven laminate comprised of an intermittently bonded web of continuous thermoplastic polymer filaments and a cellulosic web, the laminates preferably containing three plies, wherein the outer plies are the same, and having been hot embossed under controlled conditions to set the thermoplastic polymer web into a predetermined pattern. The bulk, strength and resilience is retained under wet conditions; and the laminates may be advantageously employed as toweling and the like.

---

This invention is directed to nonwoven disposable materials, and, more particularly, to nonwoven laminates which may be utilized as toweling and the like.

When most types of commercial disposable toweling are wetted as, for example, when it is desired to use them to wipe off a surface, removing the excess water (as by squeezing the towel) typically results in the towel matting up into a ball. It is difficult to pull this ball apart and damage, as by tearing, can easily occur. Subsequent usage of the wet towel readily demonstrates that most of the strength and bulk have been lost. In short, the towel has become flimsy.

It is accordingly one object of this invention to provide a nonwoven laminate which is characterized by superior strength characteristics, bulk and resilience and which retains these characteristics when wet.

Another object lies in the provision of such a nonwoven laminate which also exhibits adequate softness, absorbency and aesthetic appeal.

A further object of the invention provides an economical process for making a nonwoven laminate having the hereinbefore described properties.

Other objects and advantages of the present invention will become apparent by reference to the following description and the accompanying drawings in which.

While the present invention is susceptible of various modifications and alternative forms, there is shown in the drawings and will herein be described in detail the preferred embodiment. It is to be understood, however, that it is not intended to limit the invention to the specific forms disclosed. On the contrary, it is intended to cover all modifications and alternative constructions falling within the spirit and scope of the invention as expressed in the appended claims. Thus, while the high bulk laminate of the present invention may be advantageously employed as toweling, it should be appreciated that it may also be utilized for a wide variety of other uses, including tablecloths, napkins, placemats and the like.

Briefly, the process hereinafter described for forming the high bulk laminate of the invention involves forming a laminate comprised of an intermittently bonded web of continuous thermoplastic polymer filaments and a cellulosic web, preferred laminates being those containing three plies wherein the outer plies are the same. The laminates are then hot embossed under controlled conditions to set the thermoplastic polymer web into a predetermined pattern.

Figures 1, 2, 3:
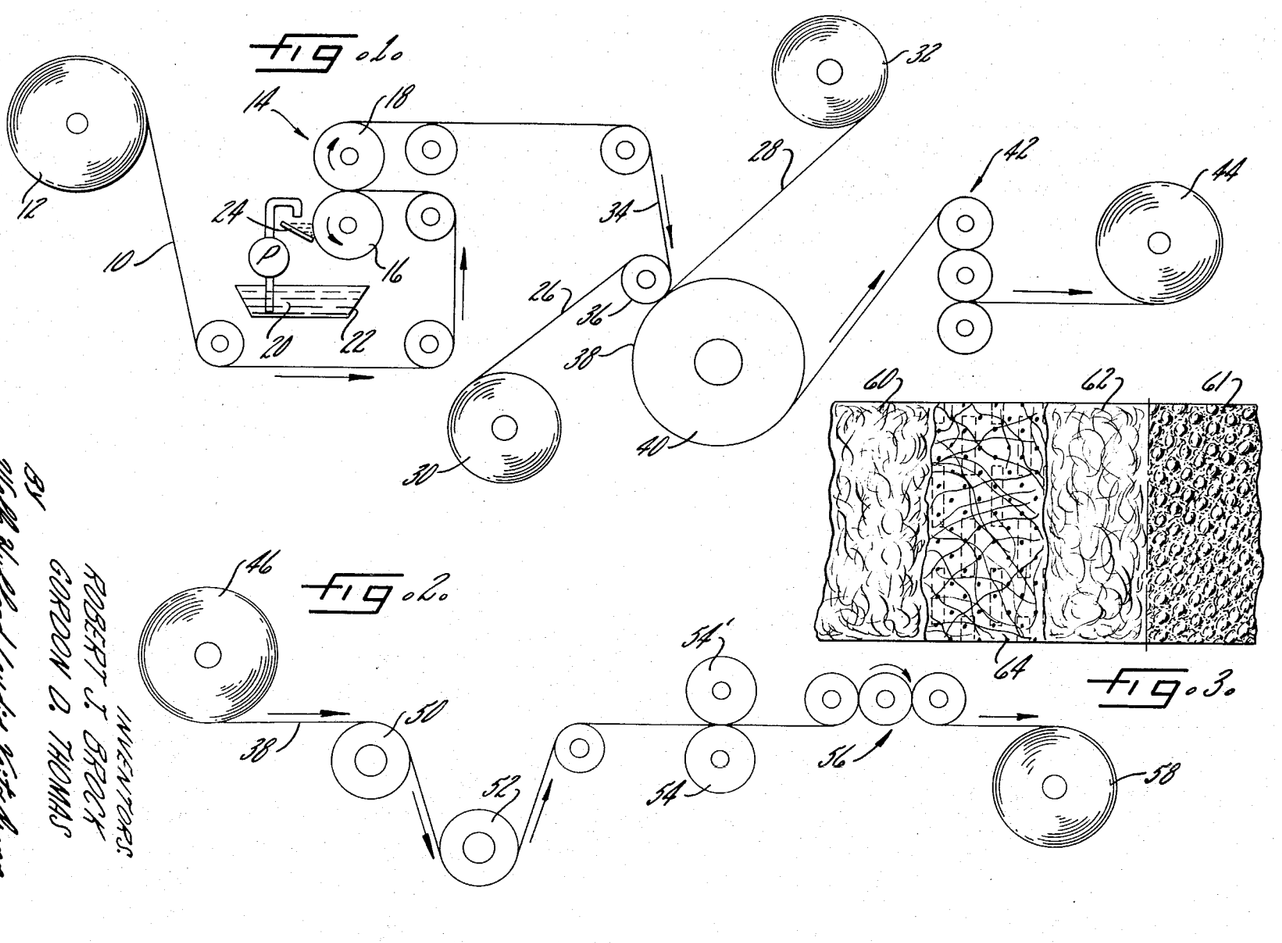
FIG. 1 is a schematic illustration of apparatus showing one means for forming a nonwoven laminate that can be advantageously used to form the high bulk material of the present invention.
FIG. 2 is a schematic illustration of apparatus and showing one means for taking the nonwoven laminates formed in FIG. 1 and then forming the high bulk laminate of the present invention.
FIG. 3 is a fragmetary plan view of the laminate of the present invention and with sections of individual layers broken away.
Figure 4:
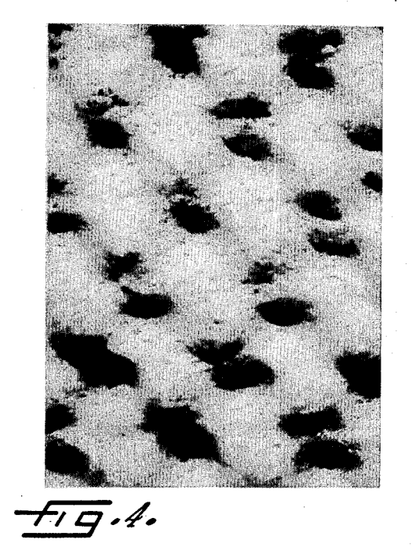
FIGS. 4 through 7 are photographic enlargements (7×) of one embodiment of the product of the present invention and illustrating its high bulk characteristics, FIG. 4 being a view of the top surface, FIG. 5 being a view of the bottom, FIG. 6 being a cross-sectional view looking into the product machine direction and FIG. 7 being a cross-sectional view looking into the cross-direction of the product.
Figure 5:
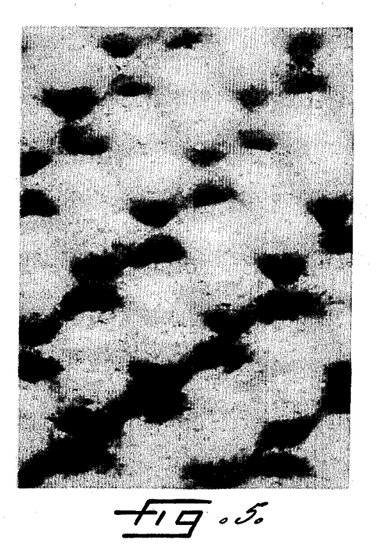
Figure 6:
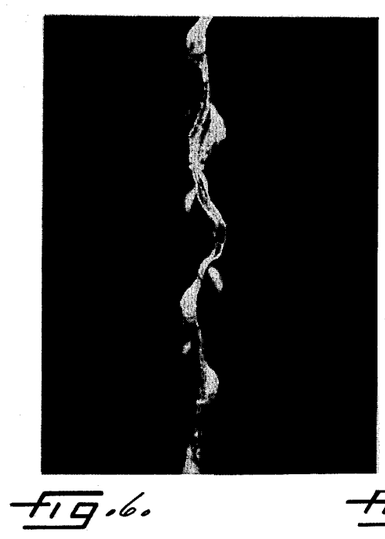
Figure 7:
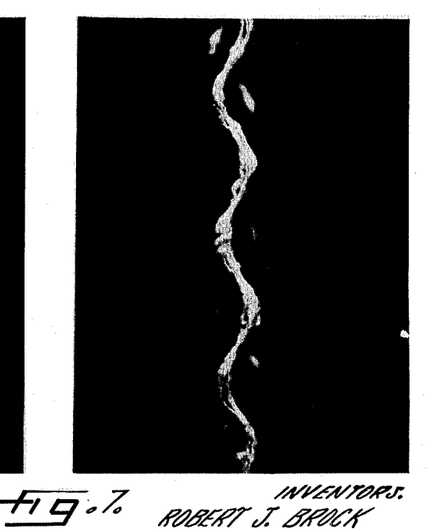
Figure 8:
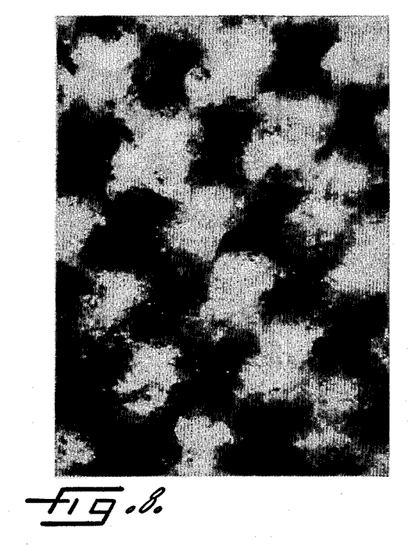
FIGS. 8 through 11 are photographic enlargements (7×) corresponding to the views shown in FIGS. 4 to 7 except showing the product after it has been thoroughly wetted.
Figure 9:
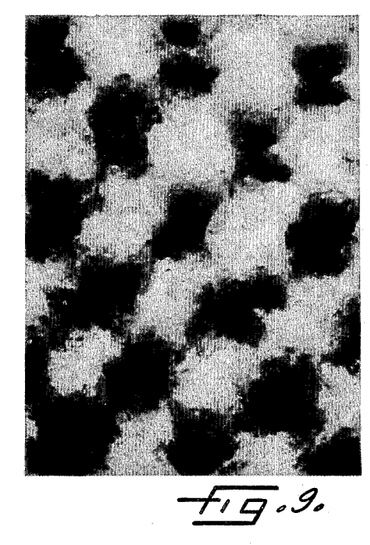
Figure 10:
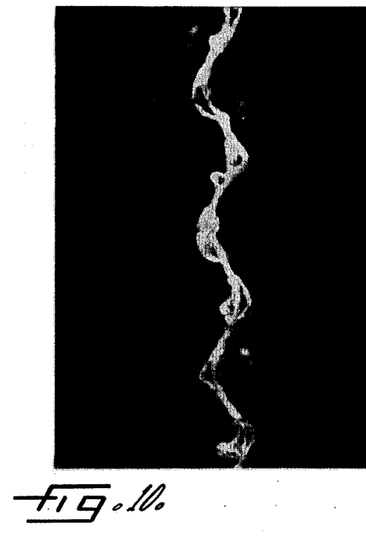
Figure 11:
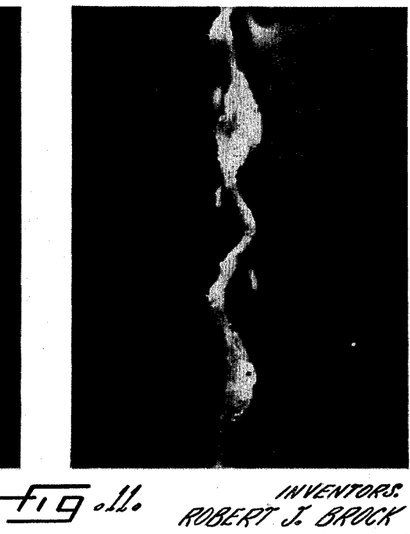
Figure 12:
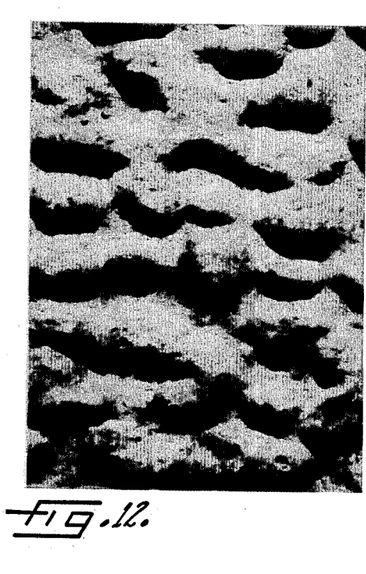
FIGS. 12 through 15 are photographic enlargements (7×) corresponding to the views shown in FIGS. 4 to 7, except showing another embodiment of the high bulk nonwoven laminate of the present invention.
Figure 13:
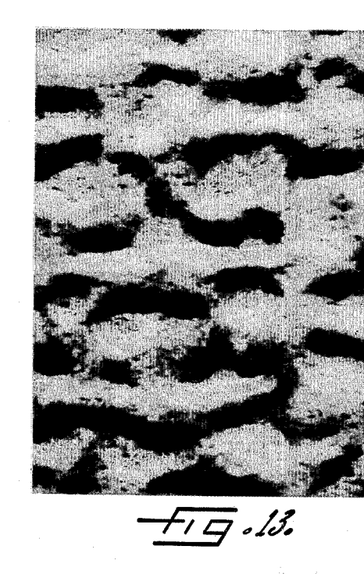
Figures 14, 15:
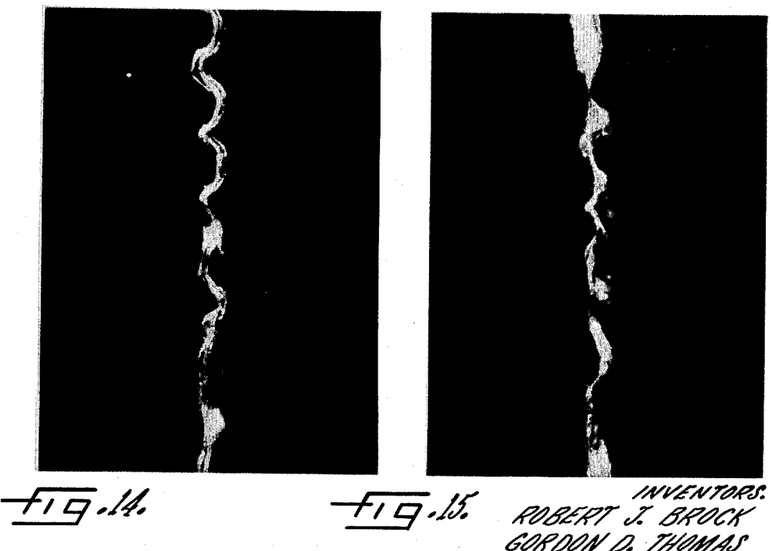
Figure 16:
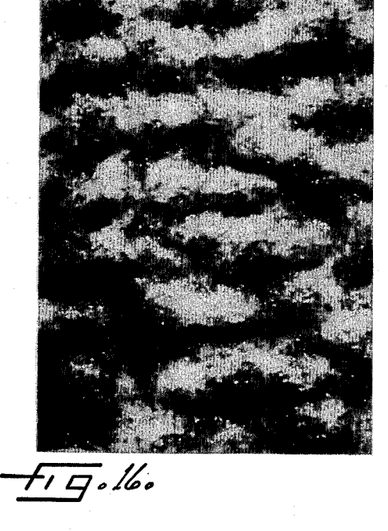
FIGS. 16 through 19 are photographic enlargements (7×) corresponding to the views shown in FIGS. 4 to 7, and showing the embodiment of FIGS. 12 to 15 after it has been thoroughly wetted.
Figure 17:
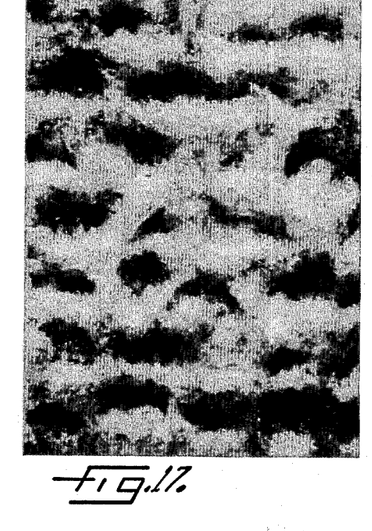
Figure 18:
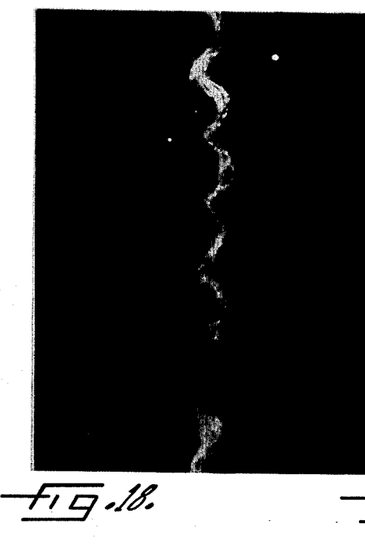
Figure 19:
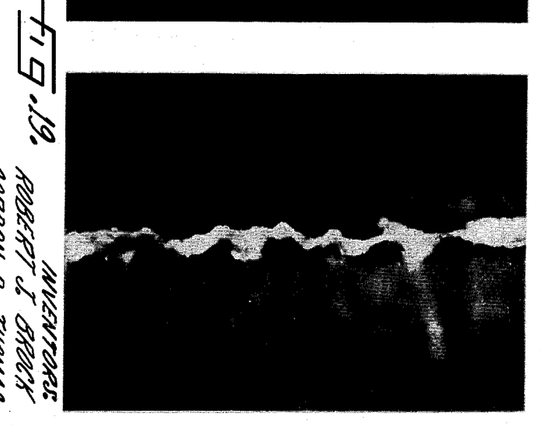

Turning now to the drawings, FIG. 1 schematically illustrates apparatus which can be used to form the intermediate product which is further processed to form the high bulk laminate of the present invention. As shown, a web 10 comprised of a plurality of substantially continuous filaments of a synthetic polymer is unwound from a roll 12 and passed to an adhesive printing station 14. The manner of the initial formation of the web 10 is not particularly important, and a variety of well known techniques can be used. In general such techniques involve continuously extruding a polymer through a spinneret, drawing the spun filaments, and thereafter depositing the drawn filaments onto a moving surface in a substantially random fashion. Drawing serves to give the polymer filaments tenacity while substantially random deposition gives the web desirable isotropic strength characteristics. U.S. Pat. 3,338,992 and 3,341,394 to Kinney, as well as other patents, such as Levy, U.S. 3,276,944, illustrate techniques of initial web formation.

A particularly useful technique is described in copending application Ser. No. 865,128, entitled "Continuous Filament Nonwoven Web and Process for Producing the Same" and filed on Oct. 9, 1969.

Use of the method therein disclosed permits high rates of web formation. In general, the discolsed method involves conventional spinning of continuous filaments of a a synthetic polymer by, for example, extruding the polymer through a multiple number of downwardly directed spinning nozzles preferably extending in a row or multiple number of rows. The filaments as they are spun are gathered into a straight row of side-by-side, evenly spaced apart, untwisted bundles each containing at least 15 and preferably from 50 to 150 filaments. These filament bundles are substantially drawn downwardly at a velocity of at least 3,000 meters per minute, and preferably from 3,500 to 8,000 meters per minute in individually surrounding gas columns, flowing at a supersonic velocity, and thus directed to impinge on a substantially horizontal carrier.

The gathering of the filaments into the bundles and their drawing and directing to impinge on the carrier is preferably effected by passing the bundles through air guns which surround the filaments with a column or jet of air which is directed downward at supersonic velocity. The air guns are arranged so as to extend in a straight row in a direction extending across the carrier at right angles to its direction of movement, so that the bundles contained in the gas column as they strike the moving carrier extend in a line or row at right angles across the carrier. In order to enhance intermingling of the bundles, the air guns can be made to oscillate, the plane of oscillation being transverse to the direction of carrier movement. The carrier can be a conventional carrier used in the nonwoven art, such as an endless carrier or belt screen or the upper portion of a drum, as for example, a screen drum.

When prepared as described above, the filament bundle containing a number of parallel filaments are laid down on the carrier in a looped-like arrangement with primary loops extending back and forth across the width of the section defined by the impingement of the air column from one gun on the carrier. Before and as parallel filament bundles impinge the carrier, they are broken into sub-bundles containing a lesser number of parallel filaments and forming secondary smaller loops and swirls. The secondary loops and swirls overlap each other, and those of adjacent sections, to result in substantially complete intermingling with the overlapping portions of adjacent sections. Thus, the laid-down filament bundles form a continuous uniform nonwoven web.

The thermoplastic which is used to prepare the continuous filament web must be crystallizable and spinnable and also capable of being bonded as hereinafter discussed. Due to its cost, predominantly isotactic polypropylene is preferred; however, other polymers such as other polyolefins, e.g., linear polyethylene, etc., vinyl plastics such as polyvinyl chloride, polyamides and polyesters can also be used. In addition, mixtures of the above polymers and copolymers prepared from monomers used in preparing the above polymers may be employed.

It is preferred to utilize a web having a basis weight of from about 10 to about 20 grams per square yard with the filaments each having a denier of from about 0.5 to 6. This provides the requisite strength at an acceptable cost level without significantly affecting the absorbency or hand.

As contrasted with the method of initial web formation, the manner in which the web is bonded, prior to lamination is important. In this respect, useful webs are those which contain an intermittent pattern of bond areas distributed substantially uniformly throughout the web. Webs wherein the total bonded area is about 5–50% of the web area and wherein the density of individual bonds is about 50–3,200 per square inch possesses a desirable combination of "hand" and tensile strength. Higher bond densities are employed with higher total bonded areas. Particularly preferred webs are those having a total bonded area of about 8–20% and a bond density of about 100–500 per inch. The use of bonded webs facilitates the present laminating process since adhesives can be directly printed on the web, thus allowing formation of a three-ply laminate with only a single adhesive printing step. Additionally, the use of intermittently bonded webs, wherein substantial open area exists thus allowing significant adhesive flow-through, results in good delamination resistance with only relatively small quantities of adhesive. In the preferred embodiment, the bonds are "released" such that, when the web is strained, a significant degree of bond failure, rather than fiber rupture, initially occurs.

The manner of preparing a release bonded web is disclosed in copending Hansen et al. application entitled "Pattern Bonded Continuous Filament Web," Ser. No. 15,034, filed on Feb. 27, 1970 and now abandoned. The bonding process illustrated therein comprises passing an unbonded continuous filament web through the pressure nip formed by a smooth hard roll and a heated embossing roll. By appropriately controlling the temperature of the rolls and the nip pressure, released bonded webs can be obtained.

As set forth in the hereinbefore described Hansen et al. application, the bonding conditions are selected so as to produce individual bonds wherein the fibers are secured together to give a stable structure, which are characterized by their ability to release a significant number of the filaments when a tensile strain is applied to the bonded web. Laminates with a desirable degree of energy absorption are achieved when the individual bonds in the continuous filament web release at least about 20%, and preferably at least about 50%, of the filaments held in the bonded area after a strain on the filaments of greater than about 80% of the filament's tenacity has been applied. The statement that a fiber filament is released from a bond area means that the filament separates from the individual bond area with its identity as an individual fiber filament being preserved. While a released fiber can be distorted, e.g., flattened out over that portion where originally bonded, it cannot be fractured and still be designated as such.

A released bonded web of continous filaments of substantially isotactic polypropylene having a basis weight of about 15 gm./yd.$^2$ can be prepared by passing the unbonded web through the previously mentioned smooth roll-embossing roll nip. At web speeds of about 270–350 feet per minute, a properly bonded web can be obtained by operating with an embossing roll temperature of about 275° F.–320° F., a smooth roll temperature of about 180° F.–270° F., and a nip pressure of about 3,000–50,000 p.s.i. Energy absorption is optimized when the web is prepared by operating with an embossing roll temperature of about 300–350° F. and a nip pressure of about 20,000–45,000 p.s.i.

Referring again to FIG. 1, at the printing station 14 the intermittently bonded continuous filament web 10 is printed on the bottom surface with a discontinuous adhesive pattern. Thus, as is shown, the web 10 passes throug a nip formed between an adhesive printing roll 16 and a back up roll 18 maintained in very light pressure engagement therewith. The surface of printing roll 16 is provided with an intaglio pattern to which adhesive may be supplied in various ways well known to those skilled in the art. For example, the lower portion of the printing roll may be submerged in a dip pan and pick up the adhesive directly from the pan, with excess adhesive being removed by a doctor blade, thus leaving only the intaglio patterned surface filled. As illustrated, adhesive 20 is transferred from a supply pan 22 to a reservoir located immediately above an inclined doctor blade 24—the reservoir being defined in part by the upper surface of the inclined doctor blade and the adjacent portion of the rotating peripheral surface of the printing roll 16. Thus, as the printing roll 16 rotates (in a counterclockwise direction as viewed in FIG. 1), the intaglio patterned surface thereof is filled with adhesive 20, excess adhesive is removed by the doctor blade 24, and a metered amount of adhesive is then transferred to the underside of the web in a preselected pattern.

The grooves on the roll 16 can be in a patterned configuration; however, it is important that the pattern be substantially open or discontinuous and that, after printing, the area of the bond which is occupied by adhesives be not more than about 25% of the total area, and preferably only about 15% or less of the area. To secure all of the advantages of the present invention, it is preferred to employ a discontinuous pattern which is not interconnected. However, a discontinuous, interconnected pattern may also be employed.

Adhesives such as hot melts, latexes, thermoplastic fibers and plastisols can be employed. The particular adhesive system employed must be capable of being applied and/or cured at temperatures and under conditions which will not adversely affect the components of the laminate. The adhesive system must also not degrade in any fashion under the temperatures and conditions later utilized in the hot embossing of the base laminate. As an example, a plastisol comprised of a polyvinyl chloride resin plasticized with dioctyl phthalate or any other well known plasticizer can be utilized in connection with a polypropylene web. At application, the viscosity of the plastisol is generally about 800–6,000 cps. and, preferably 1,200–3,200 cps., in order to obtain satisfactory transfer to the web and the desired delamination resistance of the final product.

Following the adhesive addition, the laminate is formed by bringing cellulosic webs into contact with the adhesively printed continuous filament web. Thus, cellulosic webs 26 and 28, are unwound from rolls 30 and 32, respectively, and are brought (one at a time) into contact with the adhesively printed web 34 at a squeeze roll 36 to form the laminate 38. Cellulosic webs used herein can be chosen from many of a variety of materials such as creped cellulose wadding (i.e.—tissue) and cotton or rayon webs. Cellulosic webs are preferred and the general requirements are that they exhibit some degree of extensibility and absorbency. In the case of cellulosic wadding, it has been found suitable to use wadding having a drier basis weight of from about 5 to 15 lbs./2880 ft.$^2$ and an elongation of anywhere from 10% to 150%. The particular web characteristics desired will of course be dependent upon the contemplated end use. Generally, when only a single ply on each side is to be employed, it is suitable to utilize a cellulosic web with a drier basis weight of from about 7 to 12 lbs./2880 ft.$^2$ and having a stretch of about 20 to 50%. When more than two plies are desired, it is preferable to interbond the plies to each other before bringing the plies into contact with the thermoplastic continuous filament nonwoven web. In addition, when two plies are utilized, it may be advantageous to use an outer layer with a higher drier basis weight, e.g., 9–15 lbs./2880 ft.$^2$, and the inner layer with a lower drier basis weight, e.g., 5–7 lbs./2880 ft.$^2$, so that the adhesive applied to the continuous filament web can more easily transfer through the inner web to the outer web to form a laminate with desirable bulk, softness, abrasion resistance and absorbency.

The laminate 38 may then be passed around a heated drum 40 in order to accomplish laminate formation as noted in the co-pending Hansen et al. application, U.S. Ser. No. 15,034, filed Feb. 27, 1970, now abandoned, so that the adhesive sufficiently penetrates the cellulosic layers to assure good laminate strength and yet adhesive strike through to the outer surfaces and adhesive spreading is minimized.

After leaving the drum 40, the laminate may be passed through a calender stack, shown generally at 42, to provide a smooth surface finish and then wound up on roll 44. Typically, the calender stack comprises three rolls, with the top roll generally being at about the same temperature as the drum 40 in order to assure good bonding or to complete curing in the case of a plastisol.

In accordance with the present invention, the high bulk laminate is formed by hot embossing the continuous filament cellulosic web laminate to set the continuous filament web into a predetermined, three-dimensional pattern. Thus, referring to FIG. 2, the laminate 38 is preferably preheated by rolls 50 and 52, which may be maintained at temperatures in the range of those being used for the hot embossing. The laminate is then hot embossed by passing through a set of heated matched engraved rolls. It is preferred to employ steel rolls but any other materials may be used as long as they are capable of being heated and allow sufficient heat transfer for the embossing. Preferably, the depth of the pattern on the engraved rolls is between about 0.03 to about 0.06 inch. The teeth of the matched steel rolls 54, 54' intermesh; and the laminate is forced therebetween so as to be transformed into a three-dimensional pattern. Thus, the laminate is passed between matched steel engraved rolls 54, 54'; and the surface temperature of the rolls is controlled to cause sufficient heating of the thermoplastic web without at the same time causing melting or excess shrinkage or degradation so that the embossing pattern will be set into the web upon cooling. The temperature required can be obtained by either external or internal heating of the embossing rolls. A low fixed clearance between the embossing rolls is maintained to prevent bottoming of the rolls and cutting or rupturing of the laminate. This may be accomplished by placing shims between the bearing boxes of both rolls and applying sufficient pressure loading to maintain the desired clearance.

Thereafter, the resulting hot embossed, high bulk laminate may be passed around cooling rolls, shown generally at 56, and wound up on roll 58. The thus-formed laminate combines high bulk, superior strength with high tear resistance, rupture resistance and good aesthetics. As seen in FIG. 3, the laminate 61 comprises an upper cellulosic ply 60 and a lower cellulosic ply 62 intermittently bonded to a central thermoplastic web 64. The web 64 is set in a three-dimensional pattern. The absorbency characteristics are adequate for use in commercial towel applications but may be improved by treating the continuous filament nonwoven web with any conventional wetting agent or surfactant. A suitable example is "Tergitol 15–S–7" surfactant (manufactured by Union Carbide, Inc., New York, N.Y.), a non-ionic polyglycol ether material which is biodegradable and has a molecular weight of about 530. Also suitable is "Triton X–100," an alkylphenoxy polyethoxy ethanol (manufactured by Rohm & Haas, Inc., Philadelphia, Pa.).

The resulting laminate is further characterized by the ability to retain a significant portion of properties such as its strength and bulk even after it has been saturated or wetted with water. Indeed, the wet thickness is at least about 75% of its dry thickness (determined as hereinafter set forth) and generally is 80% or more.

According to a further aspect of this invention, the hereinbafore described process may also be employed to form laminates, tailor-made for applications such as placemats, tablecloths, napkins and the like. In these applications, the process is carried out as before with the exception that the engraved rolls employed may have a more shallow patern. For example, the teeth of the rolls may have a pattern depth of as low as 0.010".

In the embodiments previously described, the cellulosic plies were positioned as the outer layers and the thermoplastic filament web was utilized as the central layer. Another feature of the present invention provides forming a high bulk laminate which has a distinctive textile-like quality.

Laminates of this type can be easily prepared by the apparatus illustrated in FIG. 1 by transposing the base materials, i.e.—continuous filament webs are substituted for the cellulosic plies 26 and 28 and a cellulosic layer replaces the continuous filament web 10. In addition to the attributes of the previous embodiments, the textile-like quality allows these laminates to serve as cloth substitutes. These laminates also possess superior wrinkle reistance and have sufficient toughness so that they may be washed several times without significantly affecting the integrity of the laminate.

The following examples are merely illustrative of the present invention and are not in limitation thereof. Unless otherwise indicated, all parts and percentages are by weight. The base laminates used to make the laminates according to the present invention were made as follows. As seen in FIG. 1, a pattern bonded polypropylene web, prepared in accordance with the preferred process hereinbefore described, having a basis weight of 15 gms./yd.$^2$. is unwound from roll 12. The web is then passed into a rotogravure printing unit. The print roll (5" diameter) has a brick pattern with adjacent rows staggered. The individual cells have dimensions of 0.2" x 0.02" and are arranged to result in a total print area of 10%. An adhesive comprising 100 parts "Geon 130 X 10" polyvinyl chloride (manufactured by B. F. Goodrich, Inc., Akron, Ohio), 100 parts dioctyl phthalate plasticizer, 10 parts mineral spirits, and having a viscosity of 1400 cps. (#3 spindle, 12 r.p.m), is applied to the web. The web adhesive ranges (measured, referring to FIG. 1, after the printed web has left the printing station 14 and is between the unnumbered turning rolls) from 5 to 5.5 gms./yd.² The printed web passes to a silicone rubber squeeze roll 36. Prior to contact, a ply of creped tissue having a basis weight of about 9 lbs./2880 ft.² is married to the printed web 34. Roll 36 is in contact with roll 40, applying a force of 200 p.l.i. against roll 40. Just prior to contact of the two plies to roll 40, a second ply of tissue 26 (also having a basis weight of about 9 lbs./2880 ft.²) is introduced. Roll 40 (24" in diameter) provided with a "Teflon" polytetrafluoroethylene resin coating, is heated to a temperature of 280° F. Roll 40 was rotating at 50 ft./min., resulting in a calculated web dwell time of about 5 seconds. The web then passes through calender stack 42. The top chrome roll (10" diameter) is heated to 225° F. and applies a force of 260 p.l.i. against a cotton-filled roll, which, in turn, contacts a second chrome roll. The top roll is the only roll which is heated directly. The resulting laminate is then wound up on roll 44.

The thus-formed base laminates are characterized by the properties and parameters set forth in Tables I and IV. The tests conducted on the base laminates were carried out as follows:

THICKNESS

This was obtained on a C & R thickness tester (Model CS–55)—with a 1 inch diameter pressure foot. The total load is as indicated in the tables.

DRY TENSILE

This was conducted on an Instron tester (Model TM–1). The samples were 1" wide x about 6" long. The sample strip was placed in the jaws, set at a 3" gage length. The crosshead speed during tensile strength was 12"/min. Strength values were read on a recording chart and expressed in lbs./1 in. wide strip.

ENERGY ABSORPTION

This is obtained by integrating the area under the stress-strain curve using a conventional Instron tensile testing machine equipped with an automatic integrator. As described in the Instron Manual Procedure #10–1–1c, energy absorption is related to the integrator read out according to the following formula (measurement being made on 3" x 1" (length x width) samples and all values referred to herein being based on such a sample size).

$$Es = (I/5000) \times L \times S$$

wherein $Es$ = energy absorption (in-lbs.)
$I$ = integrator read out
$L$ = full scale load (lbs.)
$S$ = cross-head speed (in./min.)

PERCENT ELONGATION

Elongation is the percent machine direction and cross direction stretch in the base laminate and is attained during the tensile strength testing.

GRAB TENSILE

ASTM D 1117–63.

TRAPEZOIDAL TEAR

ASTM 2263–65 T.

The hot embossed laminate of the present invention was then compared with certain commercially available products, made generally as follows:

Towel #1—conventionally water-laid and containing 2 plies

Towel #2—made in accordance with the process set forth in U.S. Pat. No. 3,414,459

Towel #3—4 plies of tissue with a central layer of a non-woven scrim

The properties and parameters of the hot embossed laminate and the other comparative products were determined as follows:

ROLL FIRMNESS

The apparatus consists of an Ames dial indicator that is graduated in 0.001" and contains a ⅛" diameter rod mounted to a support stand. At the end of the rod is attached a model P–100 Ames contact point of 1³⁵⁄₆₄" diameter.

In use, the indicator probe is gently lowered in contact with the roll towel sample to be tested and the indicator reading is recorded. A 1 pound brass weight is then applied to the upper end of the probe and a second reading is taken on the sample. The difference between the two readings expresses the depth of depression of the probe under a 1 pound load into the sample. The lower the resulting number, the greater the firmness.

BULK

Apparatus is an Ames thickness indicator, similar to the above, mounted on a support stand. The above contact point on the rod is replaced with a ¼" thick Lucite plate, 2½" x 2½". A weight is applied to the upper end of the indicator rod so that the force exhibited by the Lucite plate is equivalent to 8±1 gram per square inch. A thickness measurement is made on a stack of ten towels, 4" x 4", under this load.

ABSORBENCY RATE

This test is made according to Federal Government Specification UU–T–595b. It is made by placing a 0.1 ml. drop of water on the test sample and measuring the time in seconds with a stop watch for the gloss to disappear. This is the end point for the absorption of water by the sample.

ABSORBENCY CAPACITY

This test is also performed according to Federal Government Specification UU–T–595b. It is made by cutting a test sample 4" x 4", weighing it, and then saturating it with water for three minutes by soaking. The sample is then removed from the water and hung by one corner for 30 seconds to allow excess water to be drained off. The sample is then re-weighed, and the difference between the wet and dry weights is the water pickup of the sample expressed in grams per 4" x 4" sample.

HANDLE-O-METER

This test is a modified version of the federal specification for facial tissue Handle-O-Meter. It is made on a Thwing-Albert Handle-O-Meter instrument using 2½" wide x 6" long test samples. These tests are made on sample strips cut in both the machine direction and cross direction. The Handle-O-Meter values are expressed in grams and give an indication of sheet stiffness. Lower values indicate better handle and less stiffness.

TENSILE STRENGTH

Tensile strength tests (both wet and dry) are made on an Instron tester (Model TM–1). Samples for testing are 3" wide by about 6" long. Each end of a sample strip to be tested is clamped in the Instron jaws, that are set at a 4" gage length. Crosshead speed during a tensile strength test is 20" per minute. Strength values are read on the recording chart and expressed in grams per 3" wide strip.

SUBJECTIVE RATING

This test is performed by a panel of trained girls. Towel samples within a group are subjectively rated or ranked for such properties as stiffness and harshness.

DRY AND WET TOWEL THICKNESS

These tests are done on the same type of Instron instrument as used for tensile strength testing. Modifications that are made consist of replacing the sample clamping jaws with compression plates and using a compression loading rate of 0.1 inch per minute. The compression plates are circular and have an area of 4 square inches. A towel sample to be tested for dry thickness is cut to a size of 2" x 2" and inserted between the compression plates. The thickness of the sample is read from the recording chart at a compression load of 0.4 lb./square inch.

Testing the wet thickness of a sample is done the same as on a dry sample. Prior to testing, the sample is wetted by soaking in water for 15 seconds, and then is removed and drained of excess water for one minute.

ELONGATION

Elongation is the percent machine direction stretch in a towel sample. It is obtained from the Instron chart during machine direction tensile strength testing.

Example 1

A base laminate was made according to the procedure hereinbefore described and had the following properties:

TABLE I

| Basis, wt.-gm./sq. yd. | Thickness, in. at 4 oz./sq. in. loading | Dry tensile, lb./sq. | Energy, in.-lb. | Percent elongation | Grab tensile, lbs. | Tear, lbs. |
| --- | --- | --- | --- | --- | --- | --- |
| 46.6 | 0.0065 | MD: 5.95 | 3.00 | 24.0 | 15.7 | 4.1 |
| | | CD: 4.92 | 3.87 | 44.0 | 14.0 | 4.1 |

The base laminate was then passed through matched steel engraved embossing rolls having diameters of about 6¼". External electrical heaters were used to bring the surface temperatures of both rolls to about 260–290° F. An embossing speed of about 60 feet/minute was maintained. The resulting hot embossed laminate had the following properties:

TABLE II

| Thickness at 4 oz./sq. in. loading | Tensile, lbs./in. | Energy, in.-lbs. | Percent elongation | Grab tensile, lbs. | Tear, lbs. |
| --- | --- | --- | --- | --- | --- |
| 0.054" | MD: 6.0 | 3.0 | 32.6 | 14.4 | 3.1 |
| | CD: 4.3 | 2.92 | 37.4 | 11.4 | 2.9 |

The embossed laminate was made into roll towels on 1⅝" cores, being perforated to provide sheet lengths of 11". Samples were made by using the material as is, and also running it through a low pressure calender nip prior to winding into roll towels. The following shows the roll towel properties of these samples in comparison with other commercially available roll towels:

TABLE III

| | Hot embossed | Hot embossed and calendered | Towel #1 | Towel #2 | Towel #3 |
| --- | --- | --- | --- | --- | --- |
| 1. Sheets/rolls | 60 | 60 | 75 | 75 | 65 |
| 2. Roll diameter, in | 5½ | 5³⁄₁₆ | 4¹¹⁄₁₆ | 4¾ | 5⅜ |
| 3. Roll firmness, in | 0.345 | 0.362 | 0.253 | 0.272 | 0.412 |
| 4. Bulk, in. (10 towels) | 0.527 | 0.410 | 0.240 | 0.198 | 0.400+ |
| 5. Absorbency rate, seconds (drop test) | 35.8 | 17.8 | 5.1 | 2.9 | 2.9 |
| 6. Absorbent capacity, gms. (4" x 4" sample) | 2.39 | 2.80 | 2.51 | 3.62 | 4.60 |
| 7. Finished basis, wt.-lbs./2,880 sq. ft | 36.1 | 35.1 | 25.5 | 26.1 | 49.5 |
| 8. Handle-O-Meter (gm./2½" x 6"): | | | | | |
| MD | 8.1 | 7.2 | 2.5 | 6.9 | 7.0 |
| CD | 3.7 | 5.6 | 4.3 | 4.6 | 7.2 |
| 9. Tensile strength, gms./3": | | | | | |
| MD dry | 6,330 | 7,830 | [1] 3,100 | 3,770 | 6,750 |
| CD dry | 4,100 | 4,630 | [1] 1,360 | 1,850 | 3,300 |
| MD wet | 7,800 | 6,470 | 1,160 | 1,025 | 3,000 |
| CD wet | 4,770 | 5,000 | 460 | 520 | 3,300 |
| 10. Subjective ranking (lower number is best): | | | | | |
| (a) Stiffness | 2 | 2 | 5 | 4 | 1 |
| (b) Harshness | 3 | 4 | 5 | 1 | 2 |
| 11. Dry thickness (in. at 0.4 lb./in.²) | 0.034 | 0.029 | 0.024 | 0.020 | 0.032 |
| 12. Wet thickness (in. at 0.4 lb./in.²) | 0.029 | 0.026 | 0.013 | 0.016 | 0.029 |

[1] Minutes.

FIGS. 4–7 illustrate the hot embossed laminate formed in accordance with this example. As can be seen, the central thermoplastic layer is set into a three-dimensional pattern with the outer plies of tissue also generally conforming to this pattern. A comparison of FIGS. 8 to 11, showing the high bulk laminate after it has been saturated or thoroughly wetted with water, with FIGS. 4 to 7 shows the significant retention of bulk under wet conditions, which is characteristic of the laminate of this invention.

Example 2

A base laminate was embossed as in Example 1, except that engraved rolls with a different pattern were utilized. The pattern can be seen from the resulting material, a sample of which is shown in FIGS. 12–15.

The base laminate and the final product had the following properties:

TABLE IV

| | Wt., gms./sq. yd. | Thickness at 4 oz./sq. in. loading | Tensile, lbs./in. | Energy, in.-lbs. | Percent elongation | Grab tensile, lbs. | Tear, lbs. |
|---|---|---|---|---|---|---|---|
| Base laminate | 44.2 | 0.007″ | MD: 6.32<br>CD: 3.16 | 2.514<br>2.046 | 25<br>41 | 14.76<br>9.6 | 2.94<br>2.16 |
| Hot embossed laminate | 45.9 | 0.032″ | MD: 3.72<br>CD: 2.62 | 1.281<br>1.293 | 33<br>41 | 11.76<br>6.68 | 2.32<br>2.08 |

The following table illustrates the towel properties in comparison with commercially available towel materials:

TABLE V

| | Hot embossed | Hot embossed and calendered | Towel #1 | Towel #2 | Towel #3 |
|---|---|---|---|---|---|
| 1. Sheets/roll | 60 | 60 | 75 | 75 | 65 |
| 2. Roll diameter, in | 5 5/16 | 4 13/16 | 4 11/16 | 4 3/4 | 5 3/8 |
| 3. Roll firmness, in | 0.345 | 0.324 | 0.253 | 0.272 | 0.412 |
| 4. Bulk, in. (10 towels) | 0.325 | 0.281 | 0.240 | 0.198 | 0.400+ |
| 5. Absorbency rate, seconds (drop test) | 7.0 | 7.2 | 5.1 | 2.9 | 2.9 |
| 6. Absorbent capacity, gms. (4″ x 4″ sample) | 2.98 | 2.95 | 2.51 | 3.62 | 4.60 |
| 7. Finished basis, wt.-lbs./2,280 sq. ft | 32.8 | 32.1 | 25.5 | 26.1 | 49.5 |
| 8. Handle-O-Meter (gm./2½″ x 6″): | | | | | |
| MD | 8.4 | 7.2 | 2.5 | 6.9 | 7.0 |
| CD | 2.4 | 1.5 | 4.3 | 4.6 | 7.2 |
| 9. Tensile strength, gms./3″: | | | | | |
| MD dry | 4,600 | 4,270 | ¹3,100 | 3,700 | 6,750 |
| CD dry | 2,850 | 2,800 | ¹1,360 | 1,850 | 3,300 |
| MD wet | 5,270 | 4,830 | 1,160 | 1,025 | 3,000 |
| CD wet | 2,800 | 2,570 | 460 | 520 | 3,300 |
| 10. Subjective ranking: | | | | | |
| (a) Stiffness | 3 | 2 | 5 | 4 | 1 |
| (b) Harshness | 3 | 4 | 5 | 1 | 2 |
| 11. Dry thickness (in. at 0.4 lbs./in.²) | 0.029 | 0.025 | 0.024 | 0.020 | 0.032 |
| 12. Wet thickness (in. at 0.4 lbs./in.²) | 0.025 | 0.024 | 0.013 | 0.016 | 0.029 |

¹ Minutes.

A comparison of the wetted sample (FIGS. 16 to 19) to the unwetted sample (FIGS. 12–15) again demonstrates the retention of properties under wet conditions which is characteristic of the hot embossed laminate of this invention.

Thus, as has been seen, the present invention provides a novel laminate which combines high bulk, superior strength and resilience with adequate softness, absorbency and aesthetic appeal. Characteristic of this laminate is its ability to retain its properties, such as bulk and strength, under wet conditions so as to provide a material which may be advantageously employed for disposable toweling and the like.

The persent invention also provides an efficient versatile method for producing such laminates. As shown in FIGS. 1 and 2, the base laminate 38 may be wound up and later used to form the laminates of this invention. However, if desired, it should be appreciated that the hot embossed laminates could be readily formed in a continuous process. Thus, if a continuous process were preferred, the base laminate emerging from the calender stack 42 could be directly forwarded to preheat roll 50.

We claim as our invention:

1. A laminate comprising a cellulosic web having a drier basis weight of from about 5 to 15 lbs./280 ft.² and a random web comprised of a plurality of substantially continuous filaments of a thermoplastic polymer having a basis weight of from about 10 to about 20 gms./yd.², said webs being secured together by means of a spaced pattern of adhesive and said random web of continuous filaments being bonded by means of an intermittent pattern having a density of about 50 to 3,200 per square inch of the web area with the total bond area being about 5 to 50% and said random web of continuous filaments being set into a three-dimensional pattern, the cellulosic web adhesively bonded to said random web conforming to the three-dimensional pattern of the random web.

2. The laminate of claim 1 comprising outer layers of the cellulosic web and an inner layer of the continuous filament web wherein the thermoplastic polymer is polypropylene.

3. The laminate of claim 1 comprising an inner cellulosic web and outer layers of the continuous filament webs wherein the thermoplastic polymer is polypropylene.

4. A laminate comprising a cellulosic web having a drier basis weight of from about 5 to 15 lbs./2880 ft.² and a random web comprised of a plurality of substantially continuous filaments of a thermoplastic polymer having a basis weight of from about 10 to about 20 gms./yd.², said webs being secured together by means of a spaced pattern of adhesive and said random web of continuous filaments being bonded by means of an intermittent pattern having a density of about 50 to 3,200 per square inch of the web area with the total bonded area being about 5 to 50%, said random web of continuous filaments being set into a three-dimensional pattern and the cellulosic web adhesively bonded to said random web conforming to the three-dimensional pattern of the random web, the thickness of the laminate after being wetted with water being at least about 75% of its thickness prior to wetting.

5. The laminate of claim 4 comprising outer layers of the cellulosic web and an inner layer of the continuous filament web wherein the thermoplastic polymer is polypropylene.

6. The laminate of claim 4 comprising an inner cellulosic web and outer layers of the continuous filament webs wherein the thermoplastic polymer is polypropylene.

7. The laminate of claim 4 wherein the layer of the cellulosic web consists of at least two plies.

8. The laminate of claim 7 comprising the outer layers of the cellulosic web and an inner layer of the continuous filament web.

9. The laminate of claim 7 comprising an inner cellulosic web and outer layers of the continuous filament webs.

References Cited

UNITED STATES PATENTS

| | | | |
|---|---|---|---|
| 2,900,980 | 8/1959 | Harwood | 161—157 |
| 3,484,330 | 12/1969 | Sokolowski et al. | 161—59 |
| 3,368,934 | 2/1968 | Vosburgh | 161—150 |
| 3,314,841 | 4/1967 | Romanin | 161—143 |
| 3,424,643 | 1/1968 | Lewis et al. | 161—57 |
| 3,546,056 | 12/1970 | Thomas | 161—57 |
| 3,556,907 | 1/1971 | Nystrand | 156—209 |
| 2,902,395 | 9/1959 | Hirschy et al. | 161—57 |
| 3,072,511 | 1/1963 | Harwood | 161—57 |
| 3,025,199 | 3/1962 | Harwood | 161—57 |

ROBERT F. BURNETT, Primary Examiner

J. J. BELL, Assistant Examiner

U.S. Cl. X.R.

156—291, 306, 309; 161—148, 150, 156